United States Patent [19]

Itoh et al.

[11] Patent Number: 5,464,922
[45] Date of Patent: Nov. 7, 1995

[54] ORGANOPOLYSILOXANE-GRAFTED POLYBENZOBISOXAZOLES AND METHOD FOR PREPARING SAME

[75] Inventors: Maki Itoh; Akihito Sakakibara, both of Kanagawa, Japan

[73] Assignee: Dow Corning Asia Ltd., Tokyo, Japan

[21] Appl. No.: 295,348

[22] Filed: Aug. 24, 1994

[30] Foreign Application Priority Data

Aug. 25, 1993 [JP] Japan .................................. 5-210310
Aug. 25, 1993 [JP] Japan .................................. 5-210311

[51] Int. Cl.$^6$ .................................................. C08G 77/00
[52] U.S. Cl. ........................... 528/40; 528/26; 528/41; 528/38; 528/481; 556/436; 556/439
[58] Field of Search ............................. 528/41, 40, 38, 528/26, 481; 556/436, 439

[56] References Cited

U.S. PATENT DOCUMENTS

| | | | |
|---|---|---|---|
| 4,604,477 | 8/1986 | Rich | 356/436 |
| 4,924,020 | 5/1990 | Okawa | 556/441 |

FOREIGN PATENT DOCUMENTS

| | | |
|---|---|---|
| 2025289 | 6/1991 | Canada . |
| 161549 | 11/1985 | European Pat. Off. . |
| 185327 | 7/1989 | Japan . |

OTHER PUBLICATIONS

Makurom onamaa no Kagaku to kogyo, edited by Y. Yamashita, IPC (1989).
Y. Kawakami, Kobunshi, vol. 37, pp. 264–267 (1988).
Y. Chujo, Kobunshi, vol. 39, pp. 452–455 (1990).
Tezuka, et al, Polymer, vol. 30, pp. 553–557 (1989).
Tezuka, et al, Macromolecules, vol. 24, pp. 122–125 (1991).
Kawakami, et al, Polym. Bull., vol. 25, pp. 521–527 (1991).
Nagase, et al, Makromol. Chem. Rapid Commun., vol. 11, pp. 185–191 (1990).
High Performance Aromatic Polymers, (K. Hokozoku–kei & K. Zairyo), edited by Soc. Poly Sci., J P, Maruzen (1990).
M. Ballauff, Angew. Chem. Int. Ed. Engl., vol. 28, pp. 253–396 (1989).
R. W. Lenz, et al., Eur. Polym. J., vol. 19, pp. 1043–1046 (1983).
M. Ballauff, Makromol. Chem., Rapid Commun., vol. 7, pp. 407–417 (1986).
B. R. Harkness, et al., Macromolecules, vol. 24, pp. 6759–6763 (1991).
T. Heilz, et al., Makromol. Chem., vol. 190, pp. 3295–3317 (1989).
M. Ballauff, et al., Makromol. Chem., vol. 188, pp. 2865–2873 (1987).
Nagase, et al., Makromol. Chem., vol. 193, pp. 1509–1519 (1992).

*Primary Examiner*—Melvyn I. Marquis
*Attorney, Agent, or Firm*—Alexander Weitz

[57] ABSTRACT

There is disclosed a novel organopolysiloxane-grafted polybenzobisoxazole and a method for preparing the functional organopolysiloxane-grafted polybenzobisoxazoles using a phthaloyl halide-functional organopolysiloxane.

20 Claims, No Drawings

ORGANOPOLYSILOXANE-GRAFTED POLYBENZOBISOXAZOLES AND METHOD FOR PREPARING SAME

FIELD OF THE INVENTION

The present invention relates to a novel organopolysiloxane. More specifically, the invention relates to a novel phthaloyl halide-functional organopolysiloxane and to a process for preparing same. The invention further relates to the use of the above organopolysiloxane in the preparation of novel organopolysiloxane-grafted polybenzobisoxazoles.

BACKGROUND OF THE INVENTION

Macromonomers have been the subject of active investigation over the last several years, a macromonomer being a polymer or oligomer that contains a polymerizable functional group. Graft copolymer with a well-defined branch length and number of branches can be synthesized through the use of a macromonomer as the branching element in the graft copolymer. General reviews in this area are available, for example, *Makurom onomaa no Kagaku to Kogyo* [The Chemistry and Technology of Macromonomers], edited by Y. Yamashita, IPC (1989); Y. Kawakami, Kobunshi, volume 37, p. 264 (1988); and Y. Chujo, Kobunshi, volume 39, p. 452 (1990).

Most of the macromonomers known to date have the vinylphenyl group, acryloyl group, or methacryloyl group as their terminal polymerizable group, and these are used mainly for chain-growth polymerization. However, macromonomers for step-growth polymerization have been reported: these contain a terminal diol, dicarboxylic acid, dicarboxylic acid ester, diamine, phenol, and so forth. See, for example, Tezuka et al., Polymer, volume 30, p. 553 (1989); Tezuka et al., Macromolecules, volume 24, p. 122 (1991); Kawakami et al., Polym. Bull., volume 25, p. 521 (1991); Okawa et al., Japanese Patent Application Laid Open Hei 1-132634; Nagase et al., Makromol. Chem. Rapid Commun., volume 11, p. 185 (1990); Nagase et al., Japanese Patent Application Laid Open Number Hei 1-185327; and K. M. Snow, et al., Canadian Patent 2,025,289.

However, neither organopolysiloxane carrying phthaloyl halide as its polymerizable group nor a process for the preparation of such an organopolysiloxane have been reported up to now. Such a polysiloxane would be useful for the synthesis of novel polymers having organopolysiloxane side chains and a main chain of polyester, polyarylate, polyamide, polybenzobisoxazole, and so forth. Furthermore, aromatic polymers, such as aromatic polyesters, aromatic polyamides (aramides), and aromatic polyimides, have begun to occupy an important position as high-performance polymers due to their high mechanical strength, heat resistance and solvent resistance, (see, for example, *High-Performance Aromatic Polymers* (Koseino Hokozoku-kei Kobunshi Zairyo), edited by the Society of Polymer Science, Japan, Maruzen (1990)). However, these rigid linear polymers have lower solvent solubilities and higher melting points than conventional flexible polymers and thus present greater problems from the standpoint of processing. As a result, the industrial development and utilization of such polymers has only just begun in recent years.

The introduction of flexible polymers as side chains has been proposed as one method for improving the solubility and lowering the melting points of such rigid linear aromatic polymers (see for example M. Ballauff, Angew. Chem. Int. Ed. Engl., volume 28, page 253 (1989)). The following, for example, have been reported for this purpose: aromatic polyesters carrying alkyl or alkyloxy side chains and aromatic polyesters into which alkyl chains have been introduced by ester bonding (see R. W. Lenz et al., Eur. Polym. J., volume 19, page 1043 (1983); M. Ballauff, Makromol. Chem., Rapid Commun., volume 7, page 407 (1986); B. R. Harkness et al., Macromolecules, volume 24, page 6759 (1991), etc.), polystyrene-grafted aromatic polyesters (see T. Heitz et al., Makromol. Chem., volume 190, page 3295 (1989)), and aromatic polyimides carrying alkyloxy side chains (see M. Ballauff et al., Makromol. Chem., volume 188, page 2865 (1987)). Examples have also been reported of the introduction of polysiloxane side chains onto semiflexible linear aromatic polyimides for the purpose of obtaining separation membranes (see Nagase et al., Makromol. Chem., volume 193, page 1509 (1992).

However, organopolysiloxane-grafted polybenzobisoxazoles and their copolymers have been unknown up to now. In addition to the above-mentioned improvement in solubility, and so forth, novel characteristics which combine the properties of polybenzobisoxazoles and polysiloxanes may be expected from such organopolysiloxane-grafted polybenzobisoxazoles.

SUMMARY OF THE INVENTION

An object of the invention is the introduction of a novel phthaloyl halide-functional organopolysiloxane which can be used as a macromonomer for the synthesis of the above mentioned side chain-bearing copolymers. A further object of the invention is the introduction of a process for preparing said novel phthaloyl halide-functional organopolysiloxane.

Another object of the present invention is the introduction of novel organopolysiloxane-grafted polybenzobisoxazoles. A further object of the invention is the introduction of a method for preparing the organopolysiloxane-grafted polybenzobisoxazoles using the phthaloyl halide-functional organopolysiloxanes. The side chains in the polysiloxane-grafted polybenzobisoxazoles according to the invention can be freely tailored in terms of length, number, etc. As a result, the melting point of these polybenzobisoxazoles can be lowered, their solubility can be improved, and so forth. In addition, novel characteristics can be generated through a combination of the properties of polybenzobisoxazoles and polysiloxanes. Furthermore, the polybenzobisoxazoles of the present invention can be used in blends with other polybenzobisoxazoles or polysiloxanes and can be deployed as compatibilizers.

The present invention has been described in Japanese Applications for Patent Hei 5-210310 and Hei5-210311, the full disclosures of which are hereby incorporated by reference.

DETAILED DESCRIPTION OF THE INVENTION

The phthaloyl halide-functional organopolysiloxane of the present invention has the general formula

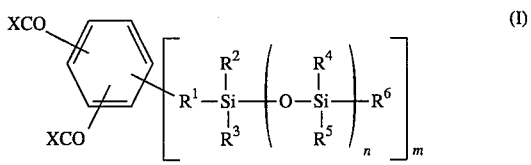

in which X denotes halogen, $R^1$ denotes a divalent organic group that contains at least 2 carbon atoms, $R^2$ through $R^6$ independently denote monovalent organic groups, n is an integer with a value of at least 1, $R^4$ and $R^5$ may vary from among different types of repeat units, and m is 1 or 2.

The group X in formula (I) denotes halogen, and the chlorine atom is preferred. The divalent organic group denoted by $R^1$ preferably contains 2 to 20 carbon atoms, and it is exemplified by alkylene, oxyalkylene, phenylenealkylene, phenyleneoxyalkylene, and so forth. The oxyalkylene group is preferred due to the corresponding ease of precursor synthesis. $R^2$ through $R^6$ are monovalent organic groups and preferably contain 1 to 10 carbon atoms. These groups are exemplified by alkyl groups such as methyl, ethyl, propyl, octyl, and so forth; substituted alkyl groups such as 2-phenylethyl, 2-phenylpropyl, 3,3,3-trifluoropropyl, and so forth; aryl groups such as phenyl and so forth; and substituted aryl groups such as tolyl and so forth. Phenyl and methyl are preferred for $R^2$ through $R^5$, and methyl is particularly preferred at these positions from an economic standpoint. $R^6$ is preferably methyl, n-butyl, sec-butyl, t-butyl, or phenyl from the standpoint of ease of acquisition of starting materials for the hydroorganopolysiloxane precursor. The subscript n is a positive integer and is preferably 1 to 5,000 and particularly preferably is 3 to 1,000. Each of the various substituent groups in formula (I) may be bonded at any position on the benzene ring.

The above organopolysiloxane can be synthesized by the following process. A catalyzed hydrosilylation reaction is first run between the derivative of a terminal olefinic compound with formula (III), in which the carboxyl groups are protected.

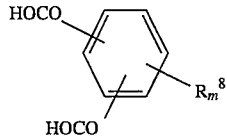
(III)

wherein $R^6$ denotes an organic group having a terminal ethylenically unsaturated bond and m is 1 or 2, and hydrogen-terminated organopolysiloxane with formula (IV)

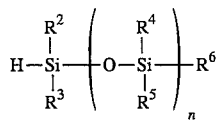
(IV)

wherein $R^2$ through $R^6$ and n are defined as above.

After deprotection of the carboxyl groups to give the phthalic acid-containing organopolysiloxane with formula (V)

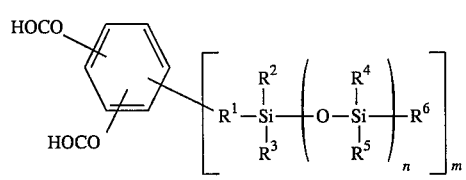
(V)

wherein $R^1$ through $R^6$, m, and n are defined as above, the carboxyl groups are silylated to yield the silylated phthalic acid-containing organopolysiloxane with formula (II)

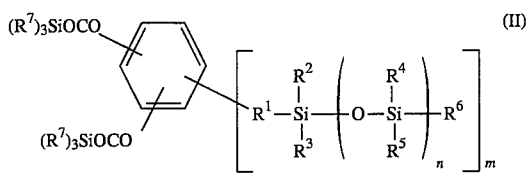
(II)

wherein $R^7$ denotes an alkyl group preferably $C_1$ to $C_{10}$, and $R^1$ through $R^6$, m, and n are defined as above.

The synthesis concludes by reacting (II) with an inorganic halide. When the carboxyl groups in compound (III) are protected by silylation, the polysiloxane produced by hydrosilylation between (III) and polysiloxane (IV) becomes identical to polysiloxane (II), and the reaction with inorganic halide may then be run without the intervening deprotection step.

Each of the various substituent groups in the terminal olefinic compound (III) may be bonded at any position on the benzene ring. This compound is exemplified by compounds having the following structures:

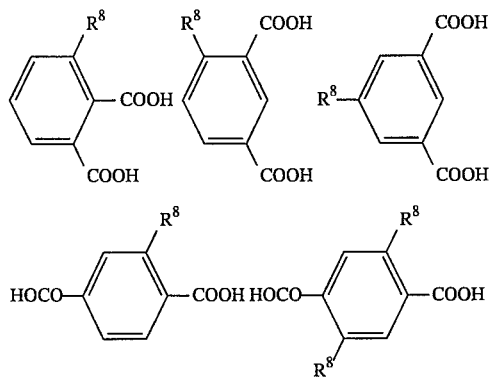

$R^6$ is exemplified by —CH=CH$_2$, —CH$_2$CH=CH$_2$, —CH$_2$CH$_2$CH=CH$_2$, —CH(CH$_3$)CH=CH$_2$, —(CH$_2$)$_6$CH=CH$_2$, —OCH=CH$_2$, —OCH$_2$CH=CH$_2$, —OCH$_2$CH$_2$CH=CH$_2$, —OCH(CH$_3$)CH=CH$_3$, and —O(CH$_2$)$_6$CH=CH$_2$. Preferred on the basis of ease of starting material acquisition are —OCH=CH$_2$, —OCH$_2$CH=CH2, —OCH2CH$_2$CH=CH$_2$, —OCH(CH$_3$)CH=CH$_2$, and —O(CH$_2$)$_6$CH=$_2$. These compounds are generally not available commercially, but they can be synthesized by the method provided below in the reference examples.

The carboxyl protection step that sets up the hydrosilylation reaction is exemplified by esterification with methyl, ethyl, methoxymethyl, tert-butyl, benzyl, beta-p-toluenesulfonylethyl, trialkylsilyl, and so forth. Trialkylsilyl esterification is preferred for the corresponding ease of removal of the protective groups from the product. The silylating agent is exemplified by trialkylhalosilanes such as trimethylchlorosilane, triethylchlorosilane, triphenylchlorosilane, methyldiethylbromosilane, and so forth, and by nitrogenous silylating agents such as hexamethyldisilazane, N,N-diethylaminotrimethylsilane, N,O-bis(trimethylsilyl) carbamate, N-trimethylsilylimidazole, and so forth.

When a trialkylhalosilane is used, the addition of a base is preferred in order to neutralize the hydrogen halide produced as by-product. A catalyst such as trimethylchlorosilane, ammonium sulfate, and so forth, may be added when a nitrogenous silylating agent is used. The silylation reaction can be conducted with or without solvent, and the solvent is exemplified by aromatic hydrocarbon solvents such as benzene, toluene, xylene, and so forth; aliphatic hydrocarbon solvents such as hexane, heptane, and so forth; ether solvents such as diethyl ether, tetrahydrofuran, and so forth; ketone solvents such as acetone, methyl ethyl ketone, and so forth; ester solvents such as ethyl acetate, butyl acetate, and so forth; halohydrocarbon solvents such as chloroform, trichloroethylene, carbon tetrachloride, and so forth; and dimethylformamide, dimethyl sulfoxide, and so forth. The reaction temperature is 0° C. to 200° C. and preferably 20° C. to 140° C.

Methods are known for the preparation of hydrogen-terminated organopolysiloxane (IV).

The hydrosilylation reaction between hydrogen-terminated organopolysiloxane (IV) and the carboxyl-protected derivative of terminal olefinic compound (III) is run in the presence of catalyst and is preferably run in solvent. A platinum catalyst is most commonly used as the catalyst, for example, chloroplatinic acid, platinum-divinyltetramethyldisiloxane complexes, Pt/C, and so forth, but transition metal catalysts such as $(Ph_3P)_3RhCl$ (Ph=phenyl), $(Ph_2PH)_3RhCl$, $(Ph_3P)_3(CO)RhH$, and other transition metal catalysts containing Co (I), Pd (II), and Ru (II) may also be employed. Suitable catalyst additions generally correspond to approximately $1/10^4$ to $1/10^2$ moles per 1 mole carbon-carbon double bond. Usable solvents emcompass the various solvents listed above and also alcohol solvents such as methanol, ethanol, propanol, and so forth. The reaction is run at temperatures of 0° C. to 200° C., and preferably 40° C. to 110° C., in a dry inert atmosphere. However, the introduction of small quantities of oxygen may be advantageous depending on the particular catalyst used.

The phthalic acid-containing organopolysiloxane (V) is then produced by removal of the protective groups from the phthalate ester-containing polysiloxane afforded by the hydrosilylation reaction. Carboxylic acid halides are ordinarily produced by reacting carboxylic acid with an inorganic halide. Said inorganic halides are exemplified by phosphoryl chloride, thionyl chloride, phosphorus pentachloride, phosphorus trichloride, and so forth. Thionyl chloride is preferred because it has a low boiling point and because the corresponding by-products are gases or low-boiling compounds, which facilitate product recovery. However, the reaction of these inorganic halides with carboxylic acid produces acid, which induces main chain scission reactions in polysiloxanes, and these inorganic halides therefore cannot be used on polysiloxane (V). On the other hand, reaction of the aforesaid inorganic halides with the silylated phthalic acid-containing organopolysiloxane (II)—which is produced by silylation of polysiloxane (V)—gives trialkylhalosilane as by-product. This permits synthesis of the acid halide without inducing main chain scission reactions in the polysiloxane.

This silylation can be run by the same method as described above. The reaction between the silylated polysiloxane and inorganic halide (preferably thionyl chloride) can be run without solvent or in the solvents listed above. Zinc chloride, pyridine, iodine, triethylamine, etc., can be used as catalyst, but the use of catalyst may be omitted. The reaction temperature is –50° C. to 140° C. and preferably –30° C. to 120° C.

When the carboxyl groups in compound (III) have been protected by silylation, the hydrosilylation reaction with polysiloxane (IV) produces the silylated polysiloxane (II), which can then be directly reacted with inorganic halide without removal of the protective groups.

The organopolysiloxane-grafted polybenzobisoxazoles of the present invention comprise repeat units with formulas (VI) and (VII) wherein the repeat unit (VI)/repeat unit (VII) molar ratio is in the range of 100/0 to 1/99.

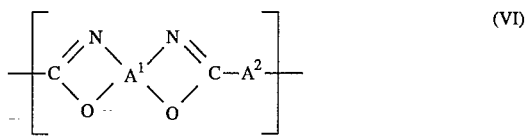

(VI)

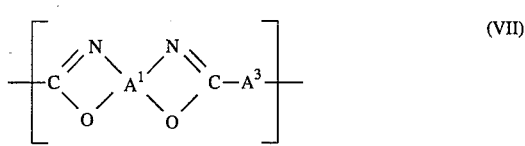

(VII)

In the preceding formulas, $A^1$ denotes a tetravalent aromatic group; $A^2$ denotes a divalent organopolysiloxane with formula (VIII)

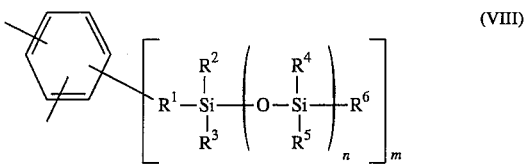

(VIII)

Wherein $R^1$ through $R^6$, n and m are as previously defined; and $A^3$ comprises at least one selection from reactive side chain-free divalent aromatic groups and reactive side chain-substituted divalent aromatic groups, wherein the molar ratio of reactive side chain-free divalent aromatic groups to reactive side chain-substituted divalent aromatic groups is in the range of 100/0 to 0/100, with the proviso that $A^1$, $A^3$, $R^1$ through $R^6$, m, and n may vary among different types of repeat units.

The tetravalent aromatic groups indicated by $A^1$ in formulas (VI) and (VII) preferably contain 6 to 30 carbon atoms. The following groups may be cited as examples; however, the present invention is not limited to these groups.

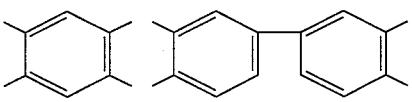

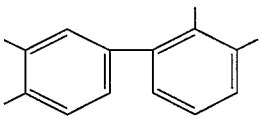

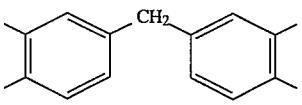

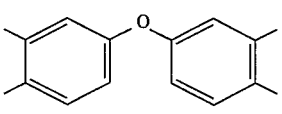

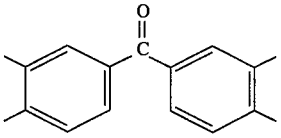

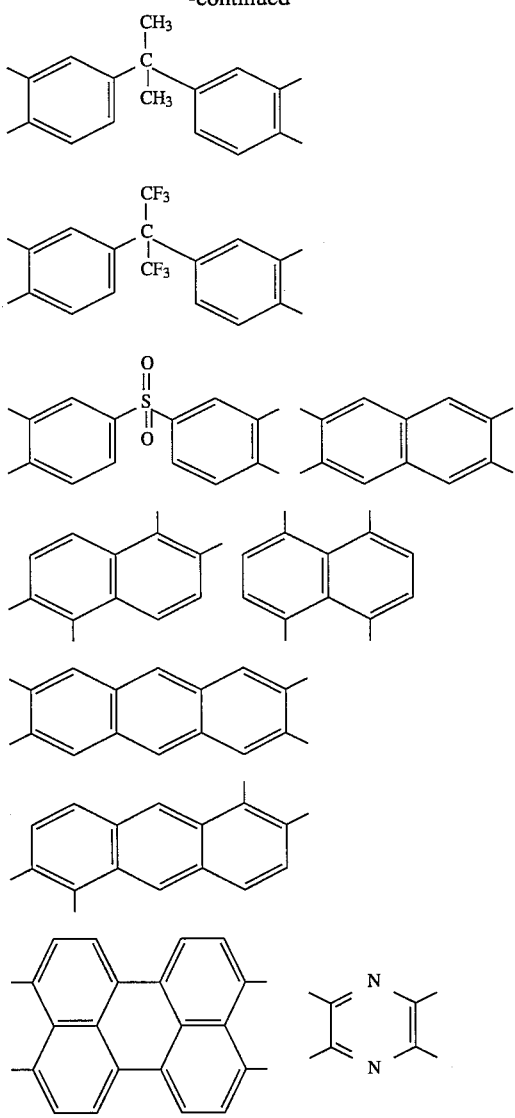

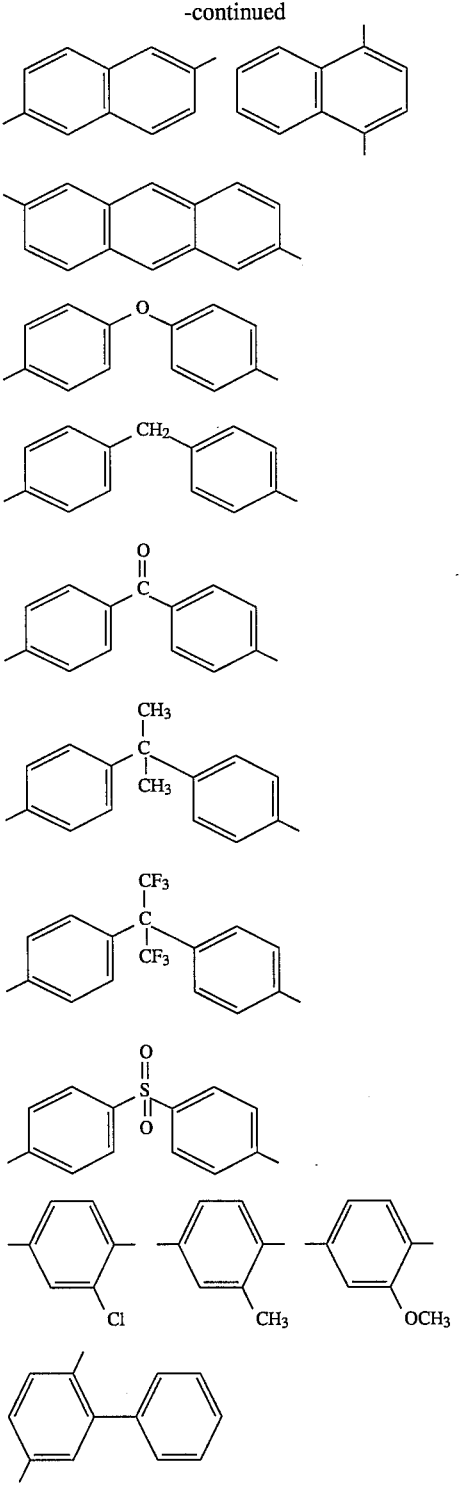

The reactive side chain-free divalent aromatic groups encompassed by $A^3$ in formula (VII) preferably have 6 to 60 carbon atoms. The following groups may be cited as examples; however, the present invention is not limited to these groups.

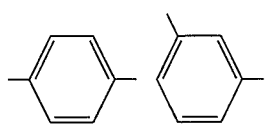

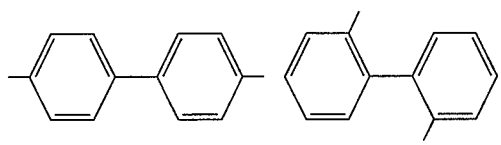

The reactive side chain-containing divalent aromatic groups encompassed by $A^3$ in formula (VII) contain one or more groups $-R^9Q$ bonded as substituents on aromatic groups as described above for reactive side chain-free $A^3$. $R^9$ denotes a divalent organic group, preferably with 2 to 20 carbon atoms. Examples of such groups include alkylene, oxyalkylene, phenylenealkylene, phenyleneoxyalkylene, etc.; however, oxyalkylene is preferred from the standpoint of ease of acquisition. Q denotes a reactive group, preferably with a molecular weight of 16 to 150 . Examples of such groups include vinyl, acryloyl, methacryloyl, hydroxyl, amino, carboxyl, epoxy, SiH, SiOH, alkoxysilyl, etc. Vinyl, acryloyl, and methacryloyl, etc., are preferred from the standpoint of ease of synthesis.

The organopolysiloxane-grafted polybenzobisoxazoles according to the present invention can be prepared by the method described below. Specifically, a reaction is first run among phthaloyl halide-functional organopolysiloxane with formula (I), above, an aromatic dicarboxylic acid halide with formula (IX)

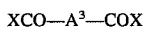  (IX)

wherein X indicates halogen, preferably the chlorine atom, and $A^3$ has the same meaning as above, and a silylated aromatic compound with formula (X)

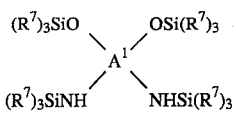  (X)

in which $R^7$ denotes alkyl, preferably a $C_1$ to $C_{10}$ alkyl group, and $A_1$ has the same meaning as above, to yield an organopolysiloxane-grafted silylated polyhydroxyamide comprising repeat units with formulas (XI) and (XII)

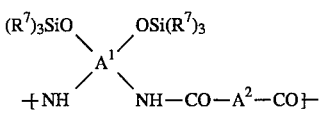  (XI)

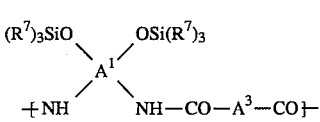  (XII)

where $R^7$ and $A^1$ through $A^3$ in the preceding formulas are defined as above and wherein the repeat unit (XI)/repeat unit (XII) molar ratio is in the range of 100/0 to 1/99 and the reactive side chain-free divalent aromatic group/reactive side chain-substituted divalent aromatic group molar ratio for $A^3$ is in the range of 100/0 to 0/100.

The synthesis is then concluded by thermal cyclization of the organopolysiloxane-grafted silylated polyhydroxyamide.

The subject organopolysiloxane-grafted polybenzobisoxazoles can also be prepared by hydrolyzing the aforementioned silylated polyhydroxyamide to produce organopolysiloxane-grafted polyhydroxyamide consisting of repeat units with formulas (XIII) and (XIV)

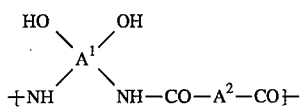  (XIII)

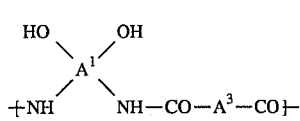  (XIV)

where $A^1$ through $A^3$ have the same meanings as above and wherein the repeat unit (XIII)/repeat unit (XIV) molar ratio is in the range of 100/0 to 1/99 and the reactive side chain-free divalent aromatic group/reactive side chain-substituted divalent aromatic group molar ratio for $A^3$ is in the range of 100/0 to 0/100. The synthesis again concludes with thermal cyclization of the organopolysiloxane-grafted polyhydroxyamide.

Among the aromatic dicarboxylic acid halides with formula (IX), the reactive side chain-free aromatic dicarboxylic acid halides are exemplified by isophthaloyl chloride, terephthaloyl chloride, 4,4'-biphenyldicarbonyl chloride, 2,2'-biphenyldicarbonyl chloride, 2,6-naphthalenedicarbonyl chloride, 1,4-naphthalenedicarbonyl chloride, 2,6-anthracenedicarbonyl chloride, biphenyl ether 4,4'-dicarbonyl chloride, diphenylmethane-4,4'-dicarbonyl chloride, benzophenone-4,4'-dicarbonyl chloride, diphenyl sulfone 4,4'-dicarbonyl chloride, isopropylidenediphenyl-4,4'-dicarbonyl chloride, hexafluoroisopropylidenediphenyl-4,4'-dicarbonyl chloride, 2-chloroterephthaloyl chloride, 2-methylterephthaloyl chloride, 2-methoxyterephthaloyl chloride, 2-phenylterephthaloyl chloride, etc. However, the present invention is not limited to these examples. Mixtures of these compounds may also be used.

Among the aromatic dicarboxylic acid halides expressed by formula (IX), the reactive side chain-substituted aromatic dicarboxylic acid halides contain one or more of the above-mentioned —$R^9Q$ bonded as substituents to the aromatic dicarboxylic acid halides provided above as examples of reactive side chain-free aromatic dicarboxylic acid halides. These compounds are not generally commercially available. However, as is shown in the reference examples below, said compounds can be obtained, for example, by reacting a terminal olefinic phthalic acid (III) with an inorganic halide as described above and preferably with thionyl chloride. In this case, of course, silylation of the carboxyl groups is unnecessary.

Examples of the above-mentioned silylated aromatic diaminodihydroxy compounds (X) include 1,5-bis(trimethylsilylamino)-2,4-bis(trimethylsiloxy)benzene, 3,3'-bis(trimethylsilylamino)-4,4'-bis(trimethylsiloxy)biphenyl, 2,3'-bis(trimethylsilylamino)-3,4'-bis(trimethylsiloxy)biphenyl, bis(3-trimethylsilylamino-4-trimethylsiloxyphenyl)methane, bis(3-trimethylsilylamino-4-trimethylsiloxyphenyl) ether, bis(3-trimethylsilylamino-4-trimethylsiloxyphenyl) ketone, 2,2-bis(3-trimethylsilylamino-4-trimethylsiloxyphenyl)propane, 2,2-bis(3-trimethylsilylamino-4-trimethylsiloxyphenyl)hexafluoro propane, bis(3-trimethylsilylamino-4-trimethylsiloxyphenyl) sulfone, 2,7-bis(trimethylsilylamino)-3,6-bis(trimethylsiloxy)naphthalene, 1,6-bis(trimethylsilylamino)-2,5-bis(trimethylsiloxy)naphthalene, 1,4-bis(trimethylsilylamino)-5,8-bis(trimethylsiloxy)naphthalene, 2,7-bis(trimethylsilylamino)-3,6-bis(trimethylsiloxy)anthracene, 1,6-bis(trimethylsilylamino)-2,5-bis(trimethylsiloxy)anthracene, 3,10-bis(trimethylsilylamino)-4,9-bis(trimethylsiloxy)perylene, 2,6-bis(trimethylsilylamino)-3,5-bis(trimethylsiloxy)pyrazine, etc. However, the present invention is not limited to these compounds, and mixtures of these compounds may also be used. These compounds are not generally commercially available; however, said compounds can be synthesized from the corresponding diaminodihydroxy compounds, as will be described later in the reference examples.

The silylated polyhydroxyamide is obtained by reacting equimolar amounts of dicarboxylic acid halide and compound (X) in a dry inert atmosphere. This reaction may be run without a solvent, but is preferably run in a solvent. Usable solvents are exemplified by the various solvents mentioned above (excluding alcohols) and their mixtures.

The reaction temperature is preferably −70° C. to 100° C., and is even more preferably −40° C. to 40° C.

Thermal cyclization of the silylated polyhydroxyamide into polybenzobisoxazole is accomplished by first removing the solvent and then heating at 100° C. to 400° C. and preferably at 200° C. to 350° C. This step may be run in the atmosphere or in an inert gas and/or at reduced pressure.

The above-mentioned silylated polyhydroxyamide can be hydrolyzed to give the polyhydroxyamide by pouring the reaction solution into an alcohol such as methanol, etc., or by stirring the solvent-free silylated polyhydroxyamide for several hours in an alcohol such as methanol, etc. The polyhydroxyamide thus produced can be converted into the polybenzobisoxazole by thermal cyclization as described above. The polybenzobisoxazole main chain desirably has a degree of polymerization (CP) of at least 5, and the optimal repeat unit (VI)/repeat (VII) molar ratio is 100/0 to 30/70.

EXAMPLES

The present invention will be explained in greater detail below through working and reference examples; however, the invention is not limited to the examples.

REFERENCE EXAMPLE 1

Synthesis of 2-(3-butenyloxy)terephthalic acid 6.62 g 1,8-diazabicyclo[5.4.0]undecene and 100 mL benzene were added to 3.76 g hydroxyterephthalic acid (synthesized from bromoterephthalic acid by a known method) and the mixture was heated. 6.76 g bromoethane dissolved in 38 mL benzene was added dropwise in and the reaction mixture was heated under reflux for 19 hours. The salt product was filtered off, and purification by column chromatography then yielded 4.66 g diethyl hydroxyterephthalate.

3.55 g of this diethyl hydroxyterephthalate was dissolved in 100 mL dimethylformamide and combined with 640 mg crushed sodium hydroxide. 4.03 g 4-bromo-1-butene dissolved in 20 mL dimethylformamide was added dropwise in while cooling on an ice bath. After stirring the reaction for 16 hours, purification by the usual methods gave 1.8 g diethyl 2-(3-butenyloxy)terephthalate.

1.74 g of this diethyl 2-(3-butenyloxy)terephthalate was dissolved in 12 mL ethanol, and this solution was added dropwise into an ethanol (17 mL) solution of 1.95 g crushed potassium hydroxide on an ice bath. The precipitated white solid was recovered and dissolved in water. Neutralization with dilute hydrochloric acid gave 1.15 g 2-(3-butenyloxy)terephthalic acid.

EXAMPLE 1

Synthesis 1 of Polysiloxane Carrying Terminal Terephthaloyl Chloride 1.00 g 2-(3-butenyloxy)terephthalic acid synthesized according to Reference Example 1, 10 mg ammonium sulfate, and 7.65 g hexamethyldisilazane were combined and stirred at 60° C. for 24 hours. The ammonium sulfate was then removed and the excess hexamethyldisilazane was distilled off under reduced pressure to give 1.58 g bistrimethylsilyl 2-(3-butenyloxy)terephthalate.

1.58 g of this bistrimethylsilyl 2-(3-butenyloxy)terephthalate product was dissolved in 29 ml dry toluene and 70 microliters 3% chloroplatinic acid 2-propanol solution was added. This was followed by the dropwise addition of a toluene solution of 8.12 g hydrogen-terminated polysiloxane with the following formula.

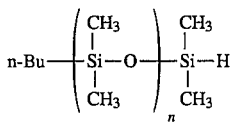

After stirring at 60° C. for 4 hours, the silyl groups were eliminated by hydrolysis to yield 5.90 g polysiloxane carrying terminal terephthalic acid.

2.70 g of this terephahalic acid-terminated polysiloxane produce was stirred at 60° C. for 24 hours with 10 mg ammonium sulfate and 7.65 g hexamethyldisilazane. The product was polysiloxane carrying terminal bistrimethylsilyl terephthalate.

This product was stirred with 1.96 g thionyl chloride at 80° C. for 3 hours. The excess thionyl chloride, etc., was removed under reduced pressure to give 2.70 g polysiloxane carrying terminal terephthaloyl chloride. $^1$H NMR spectrum (in CDCl$_3$) delta (ppm): 8.01 (d, 1H), 7.76 (d, 1H), 7.63 (s, 1H ), 4.13 (t, 2H), 1.87 (m, 2H), 1.55 (m, 2H), 1.30 (m, 4H), 0.86 (t, 3H), 0.52 (t, 2H), 0.13 to 0.02 (m, 167.4H).

EXAMPLES 2 and 3

Syntheses 2 and 3 of Terephtaloyl Chloride-terminated Polysiloxane

Polysiloxanes bearing terminal terephthaloyl chloride and having different degrees of polymerization were synthesized by the procedure described in Example 1. The results are reported in Table 1. Similar $^1$H NMR spectra were obtained as the product in Example 1 except for the difference in the relative intensity of the O—Si( CH$_3$)$_2$—O peak.

TABLE 1

| example number | average value of n | HPS | TPA-PS | TPA-PS used in the subsequent reaction | TPC-PS |
|---|---|---|---|---|---|
| 2 | 6.9 | 0.80 g | 0.67 g | 0.65 g | 0.66 g |
| 3 | 46.2 | 6.74 g | 4.83 g | 3.00 g | 2.98 g |

HPS = hydropolysiloxane
TPA-PS = terephthalic acid-containing polysiloxane
TPC-PS = terephthaloyl chloride-containing polysiloxane

REFERENCE EXAMPLE 2

Synthesis of 3,3'-bis(trimethylsiloxy)-4,4'-bis(trimethylsilylamino)biphenyl 0.540 g 3,3'-dihydroxy-4,4'-diaminobiphenyl (synthesized from 3,3'-dimethoxy-4,4'-diaminobiphenyl using hydrogen iodide by the known method) and 1.52 g triethylamine were dissolved in 16 mL dry tetrahydrofuran. 1.63 g trimethylchlorosilane was then added dropwise followed by heating under reflux for 72 hours. Operating in an argon atmosphere, the salt was filtered off and the solvent, etc., was removed under reduced pressure to yield 3,3'-bis(trimethylsiloxy)-4,4'-bis(trimethylsilylamino)biphenyl. This monomer was prepared immediately prior to each of the polymerization reactions described below.

EXAMPLE 4

Synthesis 1 of Polysiloxane-grafted Silylated Polyhydroxyamide

Operating in an argon atmosphere, 0.347 g of the 3,3'-bis(trimethylsiloxy)-4,4'-bis(trimethylsilylamino)biphenyl synthesized in Reference Example 2 was dissolved in 10 mL dry tetrahydrofuran. A solution prepared by dissolving 1.64 g of the terephthaloyl chloride-terminated polysiloxane synthesized in Example 1 (average value of n=26.9) in 6 mL dry tetrahydrofuran was then added dropwise over 30 minutes on a −20° C. to −15° C. bath. After stirring for 4 hours at the same temperature, stirring was continued at room temperature to give a solution of polysiloxane-grafted silylated polyhydroxyamide. The reaction solution was coated on the surface of a glass plate, and the solvent was removed under reduced pressure to give a film of the silylated polyhydroxyamide. The intrinsic viscosity was 0.44 dL/g (at 30° C. in tetrahydrofuran).

IR spectrum ($cm^{-1}$): 3300 (w, b), 2963 (s), 1645 (m), 1599 (m), 1512 (s), 1412 (m), 1262 (vs), 1092 (vs), 1024 (vs), 801 (vs) where s=strong absorption
vs=very strong absorption
m=medium intensity absorption
w=weak absorption
b=broad absorption

EXAMPLE 5

Synthesis 1 of Polysiloxane-grafted Polybenzobisoxazole

The silylated polyhydroxyamide film from Example 4 was cyclized by heating for 19 hours at 300° C. in an argon atmosphere to yield the corresponding polysiloxane-grafted polybenzobisoxazole.

IR spectrum ($cm^{-1}$): 2963 (s), 1599 (m), 1559 (m), 1462 (m), 1427 (m), 1262 (vs), 1094 (vs), 1020 (vs), 802 (vs).

EXAMPLE 6

Synthesis of Polysiloxane-grafted Polyhydroxyamide

The reaction solution obtained in Example 4 was poured into a large amount of methanol, and the precipitated polysiloxane-grafted polyhydroxyamide was recovered by filtration and drying.

IR spectrum ($cm^{-1}$): 3300 (w, b), 2963 (s), 1645 (m), 1597 (m), 1512 (s), 1414 (m), 1262 (vs), 1094 (vs), 1022 (vs), 801 (vs).

EXAMPLE 7

Synthesis 2 of Polysiloxane-grafted Polybenzobisoxazole

The polysiloxane-grafted polyhydroxyamide obtained in Example 6 was thermally cyclized using the procedure of Example 5 to yield the polysiloxane-grafted polybenzobisoxazole. Its IR spectrum was the same as that obtained for the polybenzobisoxazole prepared in Example 5.

EXAMPLE 8

Synthesis of Terephthaloyl Chloride Substituted with 2 Polysiloxane Chains

Following the procedure of Reference Example 1, 4.86 g diethyl 2,5-dihydroxyterephthalate was synthesized from 4.10 g 2,5-dihydroxyterephthalic acid; 4.00 g of this diethyl ester was used to produce 2.26 g diethyl 2,5-bis(3-butenyloxy)terephthalate; and 1.50 g 2,5-bis(3-butenyloxy)terephthalic acid was obtained from 2.11 g of the diethyl 2,5-bis(3-butenyloxy)terephthalate.

Using 1.31 g of the 2,5-bis(3-butenyloxy)terephthalic acid and 15.5 g of the hydrogen-terminated polysiloxane (average value of n=26.9), 10.8 g terephthalic acid substituted with 2 polysiloxane chains was produced by the procedure of Example 1. 5.31 g terephthaloyl chloride substituted with 2 polysiloxane chains was then synthesized by the same procedure as in Example 1 from 5.43 g of the substituted terephthalic acid.

$^1$H NMR spectrum (in $CDCl_3$) delta (ppm): 7.62 (s, 2H), 4.12 (t, 2H), 1.87 (m, 2H), 1.56 (m, 2H), 1.30 (m, 4H), 0.86 (t, 3H), 0.56 (m, 4H), 0.18 to −0.03 (m, 334.8H).

EXAMPLE 9

Synthesis 2 of Polysiloxane-grafted Silylated Polyhydroxyamide

Using 3.65 g of the di-polysiloxane-substituted terephthaloyl chloride synthesized as described in Example 8 and 0.403 g of the 3,3'-bis(trimethylsiloxy)-4,4'-bis(trimethylsilylamino)biphenyl synthesized as described in Reference Example 2, a silylated polyhydroxyamide having 2 polysiloxane side chains per monomer unit was synthesized by the procedure of Example 4. The intrinsic viscosity was 0.30 dL/g (at 30° C. in tetrahydrofuran).

IR spectrum ($cm^{-1}$): 3300 (w, b), 2962 (s), 1645 (m), 1600 (m), 1512 (s), 1413 (m), 1263 (vs), 1093 (vs), 1020 (vs), 800 (vs).

EXAMPLE 10

Synthesis 3 of Polysiloxane-grafted Polybenzobisoxazole

The silylated polyhydroxyamide having 2 polysiloxane side chains per monomer unit obtained in Example 9 was thermally cyclized by the procedure of Example 5 to give polybenzobisoxazole having 2 polysiloxane side chains per monomer unit.

IR spectrum ($cm^{-1}$): 2962 (s), 1600 (m), 1559 (m), 1460 (m), 1427 (m), 1262 (vs), 1090 (vs), 1023 (vs), 800 (vs).

REFERENCE EXAMPLE 3

Synthesis of 2-(3-butenyloxy)terephthaloyl Chloride 0.100 g of the 2-(3-butenyloxy)terephthalic acid synthesized in Reference Example 1 was dissolved in 5 mL benzene. 0.757 g thionyl chloride was added, and this mixture was stirred for 3.5 hours at 80° C. The excess thionyl chloride and the solvent were removed under reduced pressure to give 2-(3-butenyloxy)terephthaloyl chloride quantitatively.

EXAMPLE 11

Synthesis 3 of Polysiloxane-grafted Silylated Polyhydroxyamide

Using 0.620 g of the 3,3'-bis(trimethylsiloxy)-4,4'-bis(t-rimethylsilylamino)biphenyl synthesized in Reference Example 2, 2.70 g of the terephthaloyl chloride-terminated polysiloxane (average value of n=26.9) synthesized in Example 1, and 33.6 mg of the 2-(3-butenyloxy)terephthaloyl chloride synthesized in Reference Example 3, a silylated polyhydroxyamide was synthesized by the procedure of Example 4. This silylated polyhydroxyamide had a polysiloxane-grafted monomer unit/3-butenyloxy-substituted monomer unit molar ratio of 9:1. The intrinsic viscosity was 0.20 dL/g (at 30° C. in tetrahydrofuran).

IR spectrum (cm$^{-1}$): 3300 (w, b), 2963 (s), 1645 (m), 1597 (m), 1516 (s), 1414 (m), 1262 (vs), 1094 (vs), 1022 (vs), 804 (vs).

EXAMPLES 12 and 13

Syntheses 4 and 5 of Polysiloxane-grafted Silylated Polyhydroxyamide

Silylated polyhydroxyamides were synthesized by the method of Example 11. These had different degrees of polymerization in the polysiloxane side chain and a value of 9:1 for the polysiloxane-grafted monomer unit/3-butenyloxy-substituted monomer unit molar ratio. The results are reported in Table 2. The IR spectra were the same as in Example 11, with the exception of different relative intensities for the O—Si(CH$_3$)$_2$—O moiety.

TABLE 2

| example number | average value of n | BTS-BTSA-BP | TPC-PS | BOTPC | intrinsic viscosity |
|---|---|---|---|---|---|
| 12 | 6.9 | 0.323 g | 0.522 g | 17.5 mg | 0.27 dL/g |
| 13 | 46.2 | 0.190 g | 1.29 g | 10.4 mg | 0.24 dL/g |

BTS-BTSA-BP = 3,3'-bis(trimethylsiloxy)-4,4'-bis(trimethylailylamino)biphenyl
TPC-PS = terephthaloyl chloride-terminated polysiloxane
BOTPC = 2-(3-butenyloxy)terephthaloyl chloride

EXAMPLE 14

Synthesis 4 of Polysiloxane-grafted Polybenzobisoxazole

The silylated polyhydroxyamide obtained in Example 11 (polysiloxane (average n=26.9)-grafted monomer unit/3-butenyloxy-substituted monomer unit moler ratio=9:1) was thermally cyclized by the procedure of Example 5 to give polybenzobisoxazole in which the molar ratio of monomer units having polysiloxane side chains (average value of n=26.9) to 3-butenyloxy-substituted monomer units was 9:1.

IR spectrum (cm$^{-1}$): 2963 (s), 1601 (m), 1526 (w), 1464 (m), 1416 (m), 1262 (vs), 1092 (vs), 1020 (vs), 802 (vs).

EXAMPLES 15 and 16

Syntheses 5 and 6 of Polysiloxane-grafted Polybenzobisoxazoles

The silylated polyhydroxyamides obtained in Examples 12 and 13 were thermally cyclized by the procedure of Example 14 to give polybenzobisoxazoles having different degrees of polymerization in their polysiloxane side chains and a value of 9:1 for the molar ratio of monomer units having polysiloxane side chains to 3-butenyloxy-substituted monomer units. The results are reported in Table 3. The IR spectra were the same as in Example 14, with the exception of different relative intensities for the O—Si(CH$_3$)$_2$—O moiety.

TABLE 3

| example number | average value of n | characteristic absorptions (cm$^{-1}$) in the IR spectra of the polybenzobisoxazoles |
|---|---|---|
| 15 | 6.9 | 1597, 1524, 1481, 1412 |
| 16 | 46.2 | 1599, 1528, 1460, 1419 |

EXAMPLE 17

Synthesis 6 of Polysiloxane-grafted Silylated Polyhydroxyamide

Using 0.505 g of the 3,3'-bis(trimethylsiloxy)-4,4'-bis(t-rimethylsilylamino)biphenyl synthesized in Reference Example 2, 1.67 g of the terephthaloyl chloride-terminated polysiloxane (average value of n=26.9) synthesized in Example 1, and 0.061 g terephthaloyl chloride, a silylated polyhydroxyamide was synthesized by the procedure of Example 4. This silyated polyhydroxyamide had a value of 7:3 for the molar ratio of polysiloxane-grafted monomer units to monomer units lacking side chains/substituent groups. The intrinsic viscosity was 0.37 dL/g (at 30° C. in tetrahydrofuran).

IR spectrum (cm$^{-1}$): 3300 (w, b), 2962 (s), 1645 (m), 1600 (m), 1512 (s), 1412 (m), 1260 (vs), 1090 (vs), 1022 (vs), 799 (vs).

EXAMPLE 18

Synthesis 7 of Polysiloxane-grafted Polybenzobisoxazole

The silylated polyhydroxyamide (molar ratio of polysiloxane (average value of n=26.9)-grafted monomer units to monomer units lacking side chains/substituent groups=7:3) from Example 17 was thermally cyclized by the procedure of Example 5 to yield a polybenzobisoxazole in which the molar ratio of polysiloxane (average value of n=26.9)-grafted monomer units to monomer units lacking side chains/substituent.groups was 7:3.

IR spectrum (cm$^{-1}$): 2963 (s), 1600 (m), 1555 (m), 1462 (m), 1425 (m), 1261 (vs), 1091 (vs), 1023 (vs), 800 (vs)

We claim:

1. A phthaloyl halide-functional organopolysiloxane having the formula (I)

$$\text{XCO} \underset{\text{XCO}}{\diagdown} \!\!\!\diagup\!\!\!\text{(phenyl)}\!\!\!\diagup \left[ R^1-\underset{\underset{R^3}{|}}{\overset{\overset{R^2}{|}}{Si}}-\left(O-\underset{\underset{R^5}{|}}{\overset{\overset{R^4}{|}}{Si}}\right)_n\!\!-R^6 \right]_m \quad (I)$$

in which X denotes halogen, $R^1$ denotes a divalent organic group having at least 2 carbon atoms, $R^2$ through $R^6$ independently denote monovalent organic groups, n is an integer having a value of at least 1 and m is 1 or 2.

2. The phthaloyl halide-functional organopolysiloxane according to claim 1, wherein m is 1.

3. The phthaloyl halide-functional organopolysiloxane according to claim 1, wherein $R^2$ through $R^5$ are methyl radicals.

4. The phthaloyl halide-functional organopolysiloxane according to claim 2, wherein $R^2$ through $R^5$ are methyl radicals.

5. A process for preparing an phthaloyl halide-functional organopolysiloxane, comprising reacting an inorganic halide with a silylated phthalic acid-containing organopolysiloxane having the formula (II)

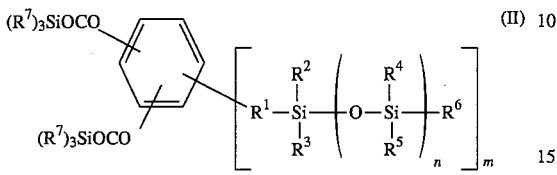

wherein $R^7$ denotes an alkyl radical, $R^1$ denotes a divalent organic group having at least 2 carbon atoms, $R^2$ through $R^6$ independently denote monovalent organic groups, n is an integer having a value of at least 1 and m is 1 or 2.

6. The process according to claim 5, wherein m is 1.

7. The process according to claim 5, wherein $R^2$ through $R^5$ are methyl radicals.

8. The process according to claim 6, wherein $R^2$ through $R^5$ are methyl radicals.

9. An organopolysiloxane-grafted polybenzobisoxazole comprising repeat units having formulas (VI) and (VII), wherein the repeat unit (VI)/repeat unit (VII) molar ratio is in the range of 100/0 to 1/99

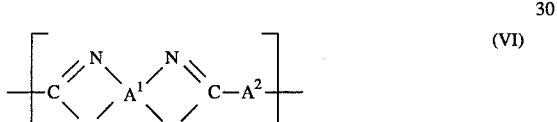

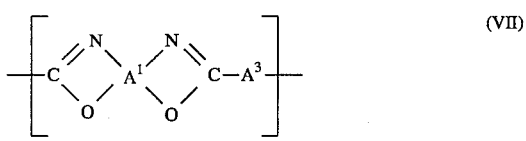

in which $A^1$ denotes a tetravalent aromatic group, $A^2$ denotes a divalent organopolysiloxane group having the formula (VIII)

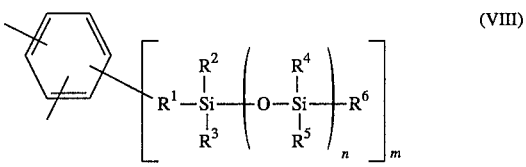

in which $R^1$ denotes a divalent organic group having at least 2 carbon atoms, $R^2$ through $R^6$ independently denote monovalent organic groups, n is an integer having a value of at least 1 and m is 1 or 2 and $A^3$ comprises at least one group selected from the group consisting of reactive side chain-free divalent aromatic groups and reactive side chain-substituted divalent aromatic groups, with the proviso that the molar ratio of reactive side chain-free divalent aromatic groups to reactive side chain-substituted divalent aromatic groups is in the range of 100/0 to 0/100.

10. The organopolysiloxane-grafted polybenzobisoxazole according to claim 9, wherein m is 1.

11. The organopolysiloxane-grafted polybenzobisoxazole according to claim 9, wherein the reactive side chain in $A^3$ is an ethylenically unsaturated organic group.

12. The organopolysiloxane-grafted polybenzobisoxazole according to claim 10, wherein the reactive side chain in $A^3$ is an ethylenically unsaturated organic group.

13. The organopolysiloxane-grafted polybenzobisoxazole according to claim 9, wherein $R^2$ through $R^5$ are methyl radicals.

14. The organopolysiloxane-grafted polybenzobisoxazole according to claim 10, wherein $R^2$ through $R^5$ are methyl radicals.

15. The organopolysiloxane-grafted polybenzobisoxazole according to claim 11, wherein $R^2$ through $R^5$ are methyl radicals.

16. The organopolysiloxane-grafted polybenzobisoxazole according to claim 12, wherein $R^2$ through $R^5$ are methyl radicals.

17. A method for preparing an organopolysiloxane-grafted polybenzobisoxazole, comprising (A) reacting (i) a phthaloyl halide-functional organopolysiloxane having the formula (I)

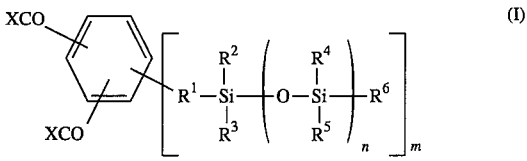

in which X denotes halogen, $R^1$ denotes a divalent organic group having at least 2 carbon atoms, $R^2$ through $R^6$ independently denote monovalent organic groups, n is an integer having a value of at least 1 and m is 1 or 2, (ii) optionally, at least one compound selected from the group consisting of a reactive side chain-free aromatic dicarboxylic acid halide and a reactive side chain-substituted aromatic dicarboxylic acid halide, and (iii) a silylated aromatic compound having the formula (X)

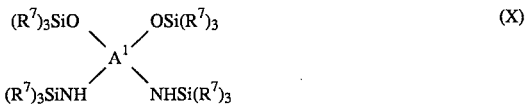

in which $R^7$ denotes an alkyl radical and $A^1$ denotes a tetravalent aromatic group, to provide an organopolysiloxane-grafted silylated polyhydroxyamide that comprises repeat units having the formulas (XI) and (XII)

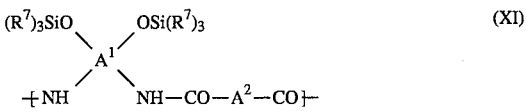

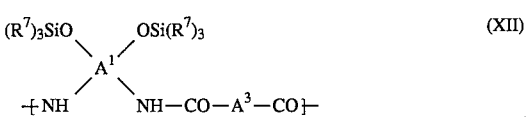

in which $R^7$ and $A^1$ have the above defined meanings, $A^2$ denotes a divalent organopolysiloxane group having the formula (VIII)

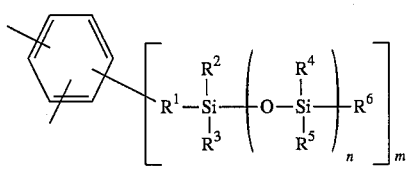

(VIII)

in which $R^1$ through $R^6$, n and m have their previously defined meanings and $A^3$ comprises at least one group selected from the group consisting of reactive side chain-free divalent aromatic groups and reactive side chain-substituted divalent aromatic groups, wherein the molar ratio of reactive side chain-free divalent aromatic groups to reactive side chain-substituted divalent aromatic groups is in the range of 100/0 to 0/100, with the proviso that the repeat unit (XI)/repeat unit (XII) molar ratio is in the range of 100/0 to 1/99, to prepare a silylated polyhydroxyamide; and (B) thermally cyclizing the silylated polyhydroxyamide prepared in step (A).

18. The method of claim 17, wherein said organopolysiloxane-grafted silylated polyhydroxyamide is (A) hydrolyzed to yield an organopolysiloxane-grafted polyhydroxyamide that consists of repeat units with formulas (XIII) and (XIV)

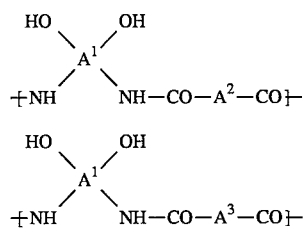

wherein $A^1$ denotes a tetravalent aromatic group, $A^2$ denotes a divalent organopolysiloxane group having the formula (VIII)

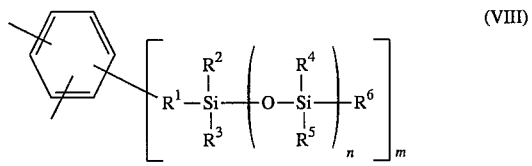

(VIII)

in which $R^1$ denotes a divalent organic group having at least 2 carbon atoms, $R^2$ through $R^6$ independently denote monovalent organic groups, n is an integer having a value of at least 1 and m is 1 or 2 and $A^3$ comprises at least one group selected from the group consisting of reactive side chain-free divalent aromatic groups and reactive side chain-substituted divalent aromatic groups, with the proviso that the molar ratio of reactive side chain-free divalent aromatic groups to reactive side chain-substituted divalent aromatic groups is in the range of 100/0 to 0/100, with the proviso that the repeat unit (XIII)/repeat unit (XIV) molar ratio is in the range of 100/0 to 1/99; and the reactive side chain-free divalent aromatic group/reactive side chain-substituted divalent aromatic group molar ratio for $A^3$ is in the range of 100/0 to 0/100; and (B) said organopolysiloxane-grafted polyhydroxyamide prepared in step (A) is thermally cyclized.

19. The method according to claim 17, wherein m is 1.

20. The method according to claim 17, wherein $R^2$ through $R^5$ are methyl radicals.

* * * * *